United States Patent
Goldstein et al.

(10) Patent No.: US 9,606,815 B2
(45) Date of Patent: Mar. 28, 2017

(54) API PRIORITIZATION AND DETECTION

(71) Applicant: International Business Machines Corporation, Armonk, NY (US)

(72) Inventors: Maayan Goldstein, Holon (IL); Eitan Daniel Farchi, Pardes Hana (IL); Onn Shehory, Yahud-Monosson (IL)

(73) Assignee: International Business Machines Corporation, Denmark, NY (US)

( * ) Notice: Subject to any disclaimer, the term of this patent is extended or adjusted under 35 U.S.C. 154(b) by 0 days.

(21) Appl. No.: 14/631,857

(22) Filed: Feb. 26, 2015

(65) Prior Publication Data

US 2016/0253185 A1    Sep. 1, 2016

(51) Int. Cl.
  *G06F 9/44*       (2006.01)
  *G06F 9/445*      (2006.01)
  *G06F 11/36*      (2006.01)

(52) U.S. Cl.
  CPC ............ *G06F 9/44505* (2013.01); *G06F 8/70* (2013.01); *G06F 8/75* (2013.01); *G06F 11/36* (2013.01)

(58) Field of Classification Search
  CPC .................................................. G06F 9/44505
  See application file for complete search history.

(56) References Cited

U.S. PATENT DOCUMENTS

| | | | |
|---|---|---|---|
| 7,739,698 B2 | 6/2010 | Brande et al. | |
| 8,370,818 B2 | 2/2013 | Osminer et al. | |
| 8,676,853 B2 | 3/2014 | Kasravi et al. | |
| 2005/0197990 A1* | 9/2005 | Wu | G06F 17/30566 706/48 |
| 2007/0299825 A1 | 12/2007 | Rush et al. | |
| 2011/0029946 A1 | 2/2011 | Joukov et al. | |
| 2011/0271253 A1* | 11/2011 | Bnayahu | G06F 8/10 717/123 |
| 2014/0208296 A1 | 7/2014 | Dang et al. | |

OTHER PUBLICATIONS

Cheng Zhang et al., "Automatic parameter recommendation for practical API usage", ICSE '12 Proceedings of the 34th International Conference on Software Engineering, pp. 826-836, 2012.
Jue Wang et al., "Mining Succinct and High-Coverage API Usage Patterns from Source Code", Mining Software Repositories (MSR), 2013 10th IEEE Working Conference on May 18-19, 2013, pp. 319-328.
Upchurch, J et al., "First byte: Force-based clustering of filtered block N-grams to detect code reuse in malicious software", Malicious and Unwanted Software: "The Americas" (MALWARE), 2013 8th International Conference on Oct. 22-24, 2013, pp. 68-76.

(Continued)

*Primary Examiner* — Brian W Wathen
*Assistant Examiner* — Abdou Seye
(74) *Attorney, Agent, or Firm* — Daniel Kligler

(57) ABSTRACT

Methods, computing systems and computer program products implement embodiments of the present invention that include receiving, by a computer, application code including a set of software elements, and identifying dependencies between the software elements. Based on the dependencies, a respective ranking score can be calculated for each of the software elements, the respective ranking score for a given software element indicating a likelihood that the given software element is configured as an application programming interface (API).

23 Claims, 3 Drawing Sheets

(56) References Cited

OTHER PUBLICATIONS

David Kawrykow and Martin P. Robillard., "Improving API Usage through Automatic Detection of Redundant Code", ASE '09 Proceedings of the 2009 IEEE/ACM International Conference on Automated Software Engineering pp. 111-122 , 2009.
Tao Xie et al., "MAPO: Mining API Usages from Open Source Repositories", MSR '06 Proceedings of the 2006 international workshop on Mining software repositories, pp. 54-57 , 2006.
Homan Ma et al., "Indexing the Java API Using Source Code", Software Engineering, 2008. ASWEC 2008. 19th Australian Conference on Mar. 26-28, 2008, pp. 451-460.
Marcel Bruch et al., "Learning from examples to improve code completion systems", ESEC/FSE '09 Proceedings of the the 7th joint meeting of the European software engineering conference and the ACM SIGSOFT symposium on the foundations of software engineering, pp. 213-222, 2009.
Daqing Hou et al., "Towards a Better Code Completion System by API Grouping, Filtering, and Popularity-Based Ranking", RSSE '10 Proceedings of the 2nd International Workshop on Recommendation Systems for Software Engineering, pp. 26-30, 2010.
Mamoun Alazab et al., "Towards Understanding Malware Behaviour by the Extraction of API Calls", Cybercrime and Trustworthy Computing Workshop (CTC), 2010 Second, Jul. 19-20, 2010, pp. 52-59.
Daniel Cabrero et al., "JISBD 03: Software Artifact Prioritization based on the Frequency of Use", Latin America Transactions, IEEE (Revista IEEE America Latina) , vol. 7, No. 3, pp. 369,376, Jul. 2009.

\* cited by examiner

API PRIORITIZATION AND DETECTION

FIELD OF THE INVENTION

This invention relates generally to computer software analysis, and specifically to analyze application code to prioritize and detect, in the application code, one or more software elements that are configured as an application programming interface (API).

BACKGROUND

In computer programming, an application programming interface (API) comprises a set of routines, protocols, and tools for building software applications. APIs can define a software component in terms of its operations, inputs, outputs, and underlying types. APIs can also define functionalities that are independent of their respective implementations, which allows definitions and implementations to vary without compromising each other.

Typically, APIs often come in the form of a library that includes specifications for routines, data structures, object classes, and variables. In other cases, such as Simple Object Access Protocol (SOAP) and Representational State Transfer (REST) services, an API may simply comprise a specification of remote calls exposed to the API consumers.

The description above is presented as a general overview of related art in this field and should not be construed as an admission that any of the information it contains constitutes prior art against the present patent application.

SUMMARY

There is provided, in accordance with an embodiment of the present invention a method, including receiving, by a computer, application code including a set of software elements, identifying dependencies between the software elements, and calculating, based on the dependencies, a respective ranking score for each of the software elements, the respective ranking score for a given software element indicating a likelihood that the given software element is configured as an application programming interface (API).

There is also provided, in accordance with an embodiment of the present invention an apparatus, including a memory configured to store application code, and a processor configured to receive application code including a set of software elements, to identify dependencies between the software elements, and to calculate, based on the dependencies, a respective ranking score for each of the software elements, the respective ranking score for a given software element indicating a likelihood that the given software element is configured as an application programming interface (API).

There is further provided, in accordance with an embodiment of the present invention a computer program product, the computer program product including a non-transitory computer readable storage medium having computer readable program code embodied therewith, the computer readable program code including computer readable program code configured to receive application code including a set of software elements, computer readable program code configured to identifying dependencies between the software elements, and computer readable program code configured to calculate, based on the dependencies, a respective ranking score for each of the software elements, the respective ranking score for a given software element indicating a likelihood that the given software element is configured as an application programming interface (API).

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
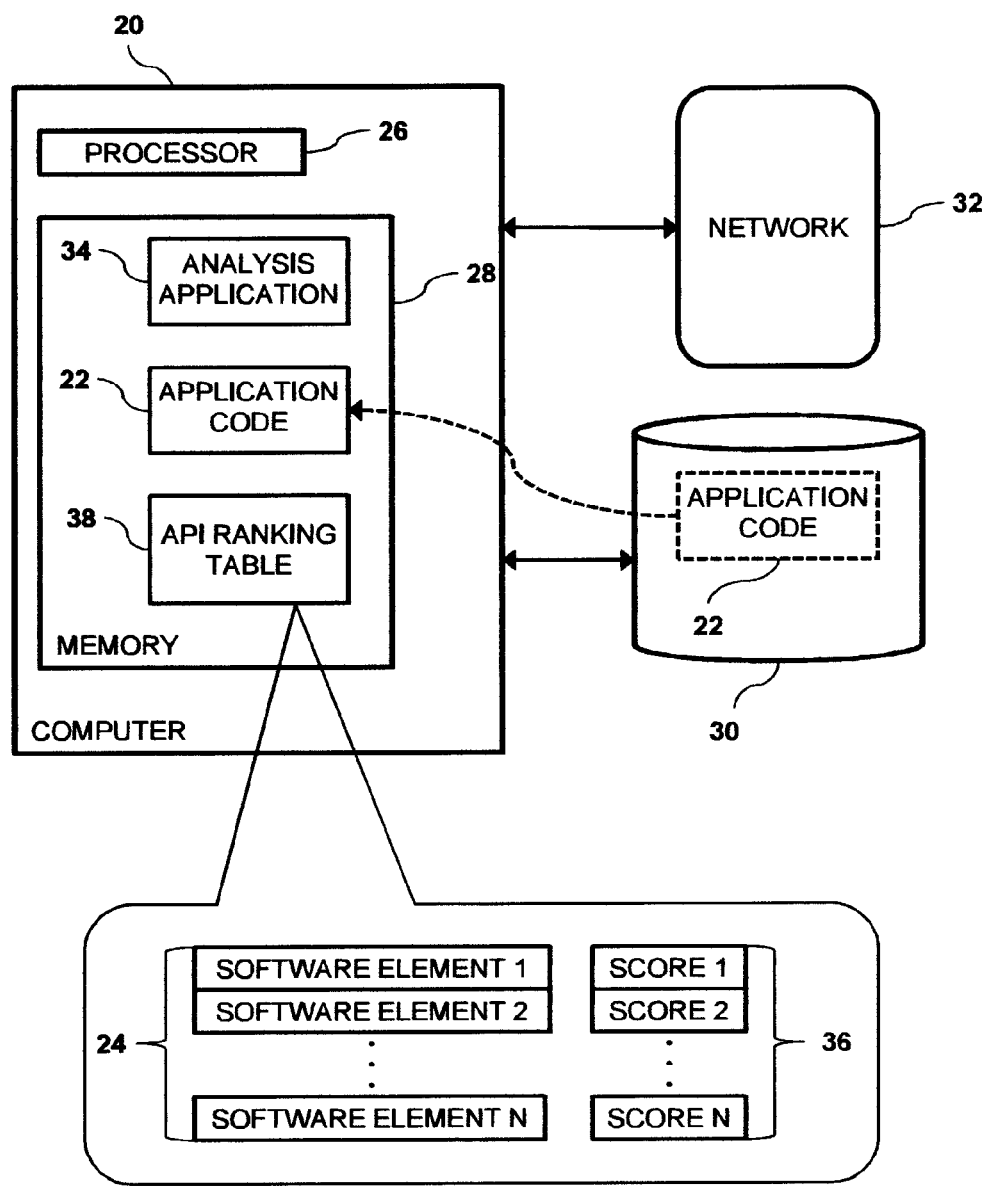
FIG. 1 is a block diagram that schematically illustrates a computer system configured to prioritize and identify, in application code, one or more software elements that are configured as an application programming interface, in accordance with an embodiment of the preset invention.

As software development shifts to mobile platforms, enterprises are looking for efficient ways to reuse their existing legacy systems by exposing application programming interfaces (APIs) in the legacy systems. These APIs are intended to be invoked from within mobile applications, or from within any other new software artifacts developed within the enterprises or provided to third party vendors. In many cases, thousands of classes/files, and hundreds of thousands of methods/functions may need to be processed to determine whether they should be exposed as APIs.

Embodiments of the present invention provide methods and systems for detecting and prioritizing APIs in an existing software artifact comprising application code. In some embodiments, a static and/or dynamic analysis based solution can be implemented to detect and prioritize the APIs based on the legacy system itself.

As described hereinbelow, an analysis can be performed to identify dependencies between various software elements at different levels in the application code, and for each given software element, a respective ranking score can be computed to indicate the given software element's likelihood to be a part of the API of the software artifact. In embodiments described herein, examples of software elements at different levels in the application code include functions and methods at a low (or lowermost) level in the application code, and packages and folders at a high (i.e., uppermost) level in the application code.

In some embodiments, the ranking score for a given software element can be computed based on a percentage of external software elements (e.g., components, classes, methods, folders, files and functions) that are accessing the given software element. Additionally or alternatively, the score for the given software element can be computed based on a number of accesses that the external software elements have to the given software element. Therefore, a given software element's score can be directly related to the number of "external" accesses to the given software element.

In embodiments where a given software element (e.g., a function or a method) comprises an API that is used by third party products but not accessed by any external software elements, the ranking score can be computed based on low-level software elements (e.g., files and/or classes) and high-level software elements (e.g., folders and/or packages) that contain the given software element.

In additional embodiments, the ranking score may comprise a "reverse" score. For example, if the software element comprises a given class that includes a given method, and no additional classes use the given class, then the software element can be assigned a high ranking score. The reason for the high ranking score is that if there is any functionality that was implemented to be used by a third party, the functionality may not be used at all in the given software element itself. On the other hand, if a given class implements a first given method that is widely used internally, and a second given method that is not used at all, then the first given method may be completely unused and is probably not an API candidate.

Therefore, systems implementing embodiments of the present invention can prioritize API candidates (e.g., functions, methods and classes) based on a number of external components (within the legacy systems) that access them and their respective number of invocations. Additionally, software elements that appear to be unused (and can in fact be used by third party systems or new applications) can be prioritized based on the reverse ratio of references to other software elements within the same parent. Embodiments of the present invention can take into account the scope of the invocation, and prioritize software elements that are not invoked at all based on other software elements.

FIG. 1 is a block diagram of a computer 20 that is configured to analyze application code 22, and prioritize, in the application code, software elements 24, thereby enabling a user (not shown) to identify one or more of the software elements that are configured as an application programming interface, in accordance with an embodiment of the invention. Computer 20 comprises a processor 26 and a memory 28. In the configuration shown in FIG. 1, processor 26 retrieves application code 22 from a storage device 30, and stores the application code in memory 28. Alternatively, processor 26 may receive application code 22 via a network 32. Examples of application code 22 include source code and compiled code such as Java™ bytecode.

In operation, processor 26 executes, from memory 28, an analysis application 34 that is configured to identify, in application code 22, software elements 24 and dependencies between the identified software elements, and to compute, based on the dependencies, a respective ranking score for each of the software elements. In one embodiment, analysis application 34 is configured to perform a static analysis on application code 22. In a second embodiment, analysis application 34 is configured to perform a dynamic analysis on application code 22 while processor 26 executes the application code.

Upon computing the ranking scores, analysis application 34 can store the identified software elements and the computed ranking scores to an API ranking table 38 in memory 28. As shown in FIG. 1, each software element 24 has a corresponding (i.e., respective) ranking score 36.

Software elements 24 comprise low-level software elements and high-level software elements (also known as components) that comprise multiple low-level software elements. Examples of low-level software elements 24 include, but are not limited to, files, classes, objects and functions. Examples of high-level software elements 24 include, but are not limited to, folders, libraries, Java™ Archives (JARS) and packages. Typically, each high-level software element 24 comprising one or more low-level software elements 24.

In embodiments of the present invention, scores 36 (also referred to herein as ranking scores 36) indicate (i.e., rank) a likelihood that a given software element 24 is configured as an API. For example, a first given software element 24 having a high respective ranking score 36 indicates that the first given software element is likely configured as an API. Likewise, a second given software element 24 having a low respective ranking score 36 indicates that the second given software element is not likely configured as an API.

In some embodiments, processor 26 can sort software elements 24 by their respective ranking scores 36 and store the sorted software elements and their respective ranking scores to API ranking table 38. If the API ranking table is sorted in reverse order (i.e., high to low order), a first given software element 24 at or near the top of the sorted table has a high ranking, and is therefore likely to be configured as an API, and a second given software element 24 at or near the bottom of the sorted table is therefore not likely to be configured as an API.

As explained hereinbelow, a given ranking score 36 for a given software element 24 can be calculated based on dependencies between the given software element and other software elements 24 in application code 22. Dependencies can be either low-level or high-level. Low-level dependencies comprise dependencies (e.g., a function call or an inheritance) between low-level software elements 24. High-level dependencies comprise dependencies between high-level software elements 24. A high-level dependency between two high-level software elements 24 occurs if there is a dependency between a first given low-level software element 24 in a first given high-level software element 24 and a second given low-level software element 24 in a second high-level software element 24.

Processor 26 comprises a general-purpose central processing unit (CPU) or special-purpose embedded processors, which are programmed in software or firmware to carry out the functions described herein. The software may be downloaded to computer 20 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Calculating Software Element Ranking Scores

Software elements 24 in application code 22 typically have a software hierarchy that indicates dependencies between the software elements. Examples of software hierarchies include, but are not limited to, inheritances and call stacks.

Figure 2:
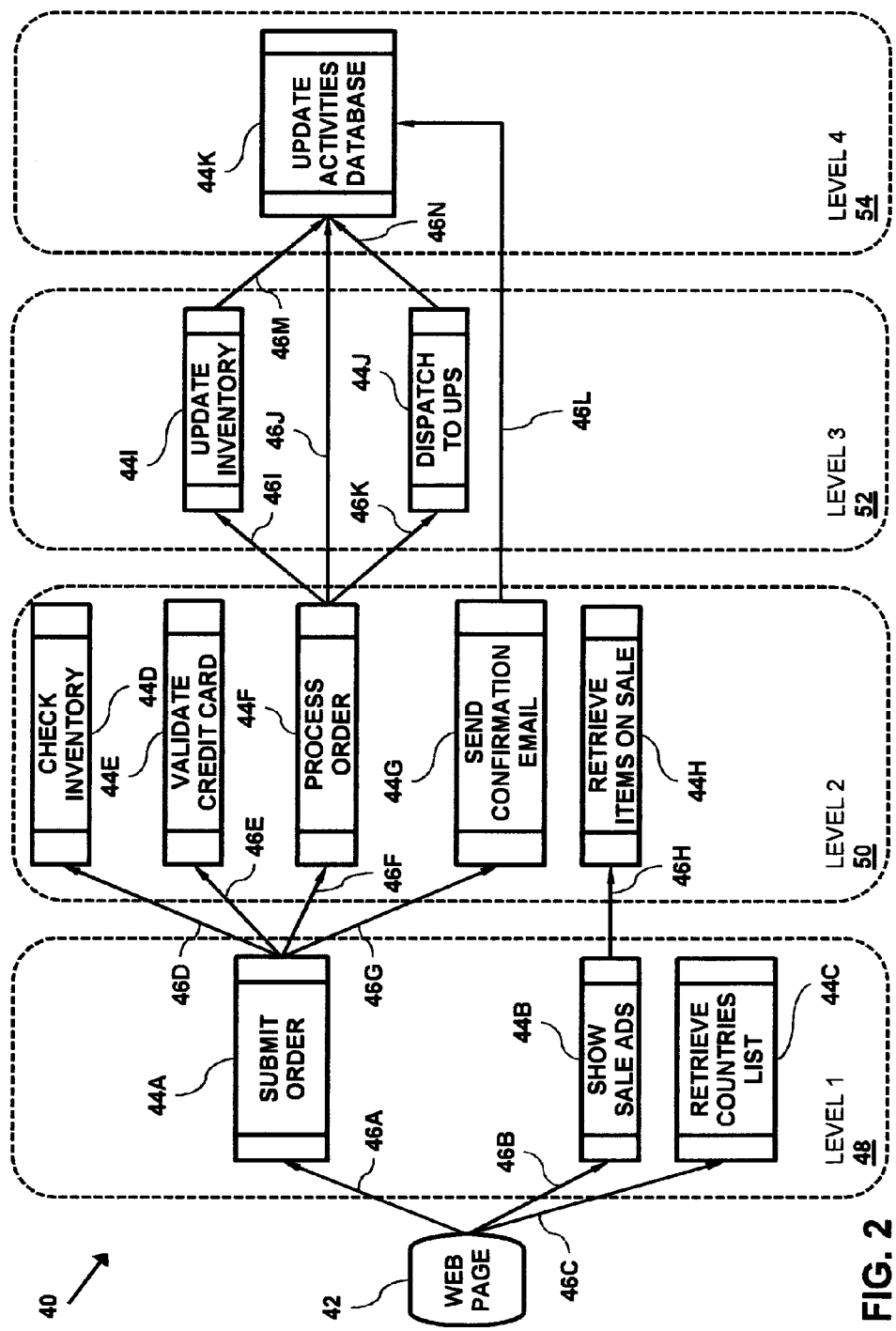
FIG. 2 is schematic diagram of a call stack for the application code, in accordance with an embodiment of the present invention.

FIG. 2 is schematic diagram of a call stack 40 for software elements 24 in a given application code 22 that is accessed by a web page 42, in accordance with an embodiment of the present invention. Call stack 40 presents the software elements in the application code as nodes 44, and presents dependencies between the software elements as edges 46. In FIG. 2, nodes 44 and edges 46 can be differentiated by appending a letter to the identifying numeral, so that the nodes comprise nodes 44A-44K and the edges comprise edges 46A-46N. Call stack 40 comprises a first level (i.e., a root/top level) that references nodes 44A-44C, a second level 50 that references nodes 44D-44H, a third level 52 that references nodes 44I and 44J, and a fourth level (i.e., a bottom/base level) 54 that references node 44K.

The example shown in FIG. 2 comprises an order processing system having multiple functions/method that are represented as nodes 44. Web page 42 comprise a user interface that invokes one of the following three functions:

SubmitOrder (node 44A).

ShowSaleAds (node 44B).

RetrieveCountriesList (node 44C).

In call stack 40, edges 44D-44N indicate dependencies of different functions on each other (e.g., calls within application code 22), and edges 44A-44C indicate how functions can be invoked from web page 42. In embodiments where analysis application 34 performs a static analysis on application code 22, the static analysis may not detect that the functions represented by nodes 44A-44C can be executed (i.e., since they are at root level 48), and appear to be "unused" since they do not have any incoming dependencies.

When analyzing application code 22, analysis application 34 can detect if a given software element is either "used" or "unused." A given unused software element 24 comprises a given function that calls other functions within the scope of application code 22. Therefore, the given function probably has a useful role in application code 22, and is likely to be configured as an API. For example, in call stack 40, the unused software elements comprise software elements 24 referenced by nodes 44A-44C. In some embodiments, as shown in FIG. 2, the software elements 24 referenced by nodes 44A-44C (i.e., the unused software elements) have no incoming dependencies.

In some embodiments, analysis application can use a "reverse page rank" algorithm when calculating respective ranking score 36 for a given low-level software element (e.g., a function) 24 and a given high-level software element 24 that contains the given low-level software element. In the example shown in call stack 40:

Function SubmitOrder (i.e., node 44A) receives a high ranking score 36, since SubmitOrder directly calls four functions (referenced by nodes 44D-44G) which in turn call an additional three functions (referenced by nodes (44I-44K).

Function RetrieveCountriesList receives a low ranking score 36, since RetrieveCountriesList does not call any additional functions in call stack 40.

On the other hand, a used software element 24 (e.g., functions) in application code 22 comprise a given software element 24 that is accessed by other software elements 24 within application code 22. Therefore, the given software element may be essential to the other software elements, and is likely to be configured as an API.

In alternative embodiments, analysis application 34 can use a regular "page rank" algorithm when calculating the respective ranking score 36 for a given low-level software element (e.g., a function) 24 and a given high-level software element 24 that contains the given low-level software element. In the example shown in call stack 40, function UpdateActivitiesDatabase (i.e., node 44K) receives a high ranking score 36, since it is called by four other functions (referenced by nodes 44F, and 44I-44K), which in turn are called by three other functions (referenced by nodes 44A, 44F and 44G).

Figure 3:
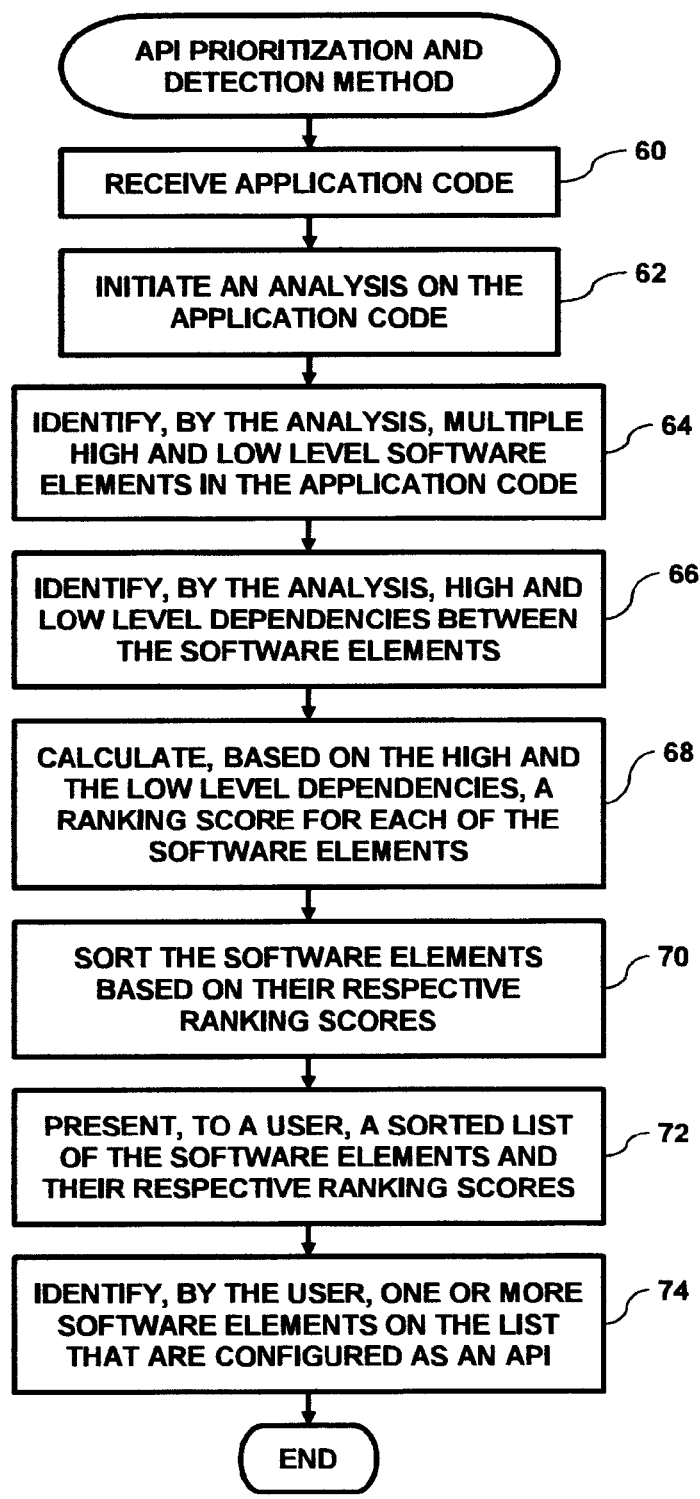
FIG. 3 is a flow diagram that schematically illustrates a method of prioritizing and detecting APIs in the application code, in accordance with an embodiment of the preset invention.

In additional embodiments, analysis application 34 can calculate the ranking scores based on the semantics of the software elements. In other words, if semantics indicate that a given software element 24 is configured as an API (or has some probability of being such), analysis application 34 can calculate the respective ranking score based on the detected semantics. For example, Java™ code may contain "accessors" (also known as "getters" and "setters") that are typically part of an API. Therefore, if analysis application 34 detects that a given software element 24 comprises an accessor, the analysis application can assign the respective ranking score a high value, either a sole factor in the score or in combination with other scoring methods. FIG. 3 is a flow diagram that schematically illustrates a method of prioritizing and detecting APIs in application code 22, in accordance with an embodiment of the preset invention. In a receiving step 60, processor 26 receives application code 22, and in an analysis step 62, the processor executes analysis application 34 to initiate an analysis of the application code. As described supra, the analysis comprises a static analysis or a dynamic analysis.

The analysis performed by analysis application 34 comprises the following steps 64, 66 and 68. In a first identification step 64, processor 26 identifies multiple high and low-level software elements 24 in application code 22, and in a second identification step 66, the processor identifies high-level dependencies between the identified high-level software elements and low-level dependencies between the low-level software elements. In a calculation step 68, processor 26 uses the identified high and low-level dependencies to calculate a respective ranking score 36 for each of the identified high and low-level software elements.

In a first embodiment, for each function/public method F in a component C that is called from within application code 22, analysis application 34 can compute the following functions to analyze and rank the functions/methods in application code 22:

Func_inv_count_ext. A number of invocations of F by functions/methods from other components.

Func_inv_count_int. A number of invocations of F from within component C.

Func_inv_num_int/Func_inv_num_ext. A number of internal/external functions/methods from which invocations to F are made.

Files_inv_num_int/Files_inv_num_ext. A number of internal/external files/classes from which invocations to F are made.

Total_rank. A combination of Func_inv_count_ext, Func_inv_count_int, Func_inv_num_int, Func_inv_num_ext, Files_inv_num_int, Files_inv_num_ext, wherein all *_ext (* indicates a wildcard) counts have a positive weight, and all *_int counts have a negative weight.

In a first example of the first embodiment, a given software element can be ranked using the following formula:

Total_rank=(Func_inv_count_ext+Func_inv_num_ext+Files_inv_num_ext−(Func_inv_count_int+Func_inv_num_int+Files_inv_num_int))/Total_number_of_relations_in_system In a second example of the first embodiment, a given software element can be ranked using the following formula:

Total_rank=Func_inv_count_ext/Func_inv_count_int+Func_inv_num_ext/Func_inv_num_int+Files_inv_num_ext/Files_inv_num_int In a second embodiment, for each function/public method F in a component C that is not called from within application code 22, analysis application 34 can compute the following functions to analyze and rank the functions/methods in application code 22:

Comp_reverse_page_rank. A page rank of C computed on a graph (e.g., call stack 40) comprising all the components as nodes and all the components level dependencies reversed as S.

Func_reverse_page_rank. A page rank of F computed on the graph containing all the functions as nodes and all the function level dependencies reversed as edges.

Total rank=linear combination of Comp_reverse_page_rank, and Func_reverse_page_rank.

In an example of the second embodiment, a given software element can be ranked as a linear combination of Comp_reverse_page_rank and Func_reverse_page_rank using the following formula:

Total rank=Comp_reverse_page_rank+1/10*Func_reverse_page_rank

In the formula described supra for the second embodiment, (a) the fewer other functions invoked, the higher the likelihood of F being used as an external API, and (b) the fewer components are using C, the higher the likelihood of C being a sort of facade or UI (e.g., web page 42) for the system, and therefore the higher the likelihood that F is part of an API. Additionally, if C is not used externally, then analysis application 34 can rank the functions within the components based on their own reverse page rank, so as to distinguish between "entry points" invoking other functionality and unused utility functions left in the code.

In some embodiments, a given software element 24 that is not called from within application code 22 is located at a root level of a software hierarchy for the application code and/or calls additional software elements in the application code. In the call stack shown in FIG. 2, the software elements ranked by the second embodiment include software elements 44A, 44B and 44C.

In additional embodiments, combinations of different other counters can be used and with different weights.

Therefore, the goal is to prioritize software elements 24 based on the context of their invocations/or non-invocations, whereas the context is defined by other software elements 24 (e.g., components).

Returning to the flow diagram, processor 26 sorts software elements 24 by their respective ranking scores 36 and stores the sorted software elements and their respective ranking scores to API ranking table 38 in a sorting step 70, and processor 26 presents API ranking table 38 to a user in a presentation step 72. Finally, in a third identification step 74, the user identifies one or more of the software elements in API ranking table 38 as an API function, and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    receiving, by a computer, application code comprising a set of software elements;
    identifying dependencies between pairs of the software elements;
    counting the dependencies between the pairs of the software elements; and
    calculating, based on the counting of the dependencies between the pairs of the software elements, a respective ranking score for each of the software elements, the respective ranking score for a given software element indicating a likelihood that the given software element is configured as an application programming interface (API).

2. The method according to claim 1, wherein the application code is selected from a list consisting of source code and bytecode.

3. The method according to claim 1, wherein the set of the software elements comprises a first subset comprising low-level software elements, and a second subset comprising high-level software elements, each of the high-level software elements comprising one or more low-level software elements.

4. The method according to claim 3, wherein the dependencies comprise low-level dependencies between the low-level software elements, and high-level dependencies based on the low-level dependencies.

5. The method according to claim 1, wherein counting the dependencies comprises performing an analysis on the application code, the analysis selected from a list consisting of a static analysis and a dynamic analysis.

6. The method according to claim 1, and comprising defining a software hierarchy for the software components, the software hierarchy having multiple levels, and wherein calculating the respective ranking score for a given software element comprises identifying the respective level of the given software component.

7. The method according to claim 1, wherein calculating the respective ranking score for a given software element comprises identifying the respecting ranking scores of one or more additional software elements referenced by the given software element.

8. The method according to claim 1, wherein calculating the respective ranking score for a given software element comprises identifying the respecting ranking scores of one or more additional software elements that reference the given software element.

9. The method according to claim 1, wherein calculating the respective ranking score for a given software element comprises identifying semantics in the application code that indicate that the given software element is configured as an API.

10. The method according to claim 1, wherein identifying a given count of dependencies for a given software element comprises determining a number of accesses by external software elements to the given software element.

11. The method according to claim 1, wherein identifying a given count of dependencies for a given software element comprises determining a percentage of external software elements that access the given software element.

12. An apparatus, comprising:
    a memory configured to store application code; and
    a processor configured:
        to receive application code comprising a set of software elements;
        to identify dependencies between pairs of the software elements;
        to count the dependencies between the pairs of the software elements; and
        to calculate, based on the counting of the dependencies between the pairs of the software elements, a respective ranking score for each of the software elements, the respective ranking score for a given software element indicating a likelihood that the given software element is configured as an application programming interface (API).

13. The apparatus according to claim 12, wherein the application code is selected from a list consisting of source code and bytecode.

14. The apparatus according to claim 12, wherein the set of the software elements comprises a first subset comprising low-level software elements, and a second subset comprising high-level software elements, each of the high-level software elements comprising one or more low-level software elements.

15. The apparatus according to claim 14, wherein the dependencies comprise low-level dependencies between the low-level software elements, and high-level dependencies based on the low-level dependencies.

16. The apparatus according to claim 12, wherein the processor is configured to count the dependencies by performing an analysis on the application code, the analysis selected from a list consisting of a static analysis and a dynamic analysis.

17. The apparatus according to claim 12, wherein the processor is configured to define a software hierarchy for the software components, the software hierarchy having multiple levels, and wherein the processor is configured to calculate the respective ranking score for a given software element by identifying the respective level of the given software component.

18. The apparatus according to claim 12, wherein the processor is configured to calculate the respective ranking score for a given software element by identifying the respecting ranking scores of one or more additional software elements referenced by the given software element.

19. The apparatus according to claim 12, wherein the processor is calculate the respective ranking score for a given software element by identifying the respecting ranking scores of one or more additional software elements that reference the given software element.

20. The apparatus according to claim 12, wherein the processor is configured to calculate the respective ranking score for a given software element by identifying semantics in the application code that indicate that the given software element is configured as an API.

21. The apparatus according to claim 12, wherein the processor is configured to identify a given count of dependencies for a given software element by determining a number of accesses by external software elements to the given software element.

22. The apparatus according to claim 12, wherein the processor is configured to identify a given count of dependencies for a given software element by determining a percentage of external software elements that access the given software element.

23. A computer program product, the computer program product comprising:
 a non-transitory computer readable storage medium having computer readable program code embodied therewith, the computer readable program code comprising:
 computer readable program code configured to receive application code comprising a set of software elements;
 computer readable program code configured to identify dependencies between pairs of the software elements;
 computer readable program code configured to count the dependencies between the pairs of the software elements; and
 computer readable program code configured to calculate, based on the counting of the dependencies between the pairs of the software elements, a respective ranking score for each of the software elements, the respective ranking score for a given software element indicating a likelihood that the given software element is configured as an application programming interface (API).

\* \* \* \* \*